US008652251B2

(12) United States Patent
Al-Mehthel et al.

(10) Patent No.: US 8,652,251 B2
(45) Date of Patent: Feb. 18, 2014

(54) SULFUR STEEL-SLAG AGGREGATE CONCRETE

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Mohammed Maslehuddin, Dhahran (SA); Saleh Al-Idi, Al-Khobar (SA); Mohammed Rizwan Ali, Al-Khobar (SA); Mohammed Salihu Barry, Thoqba (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/751,885

(22) Filed: Jan. 28, 2013

(65) Prior Publication Data

US 2013/0192495 A1    Aug. 1, 2013

Related U.S. Application Data

(60) Provisional application No. 61/591,516, filed on Jan. 27, 2012.

(51) Int. Cl.
*C04B 28/36* (2006.01)
*C04B 7/147* (2006.01)
*C04B 7/153* (2006.01)
*C04B 28/06* (2006.01)

(52) U.S. Cl.
USPC .......................... 106/789; 106/790; 106/815

(58) Field of Classification Search
USPC ................................ 106/789, 790
See application file for complete search history.

(56) References Cited

U.S. PATENT DOCUMENTS

| | | | |
|---|---|---|---|
| 4,025,352 A * | 5/1977 | Leutner et al. ............... 501/140 |
| 4,134,775 A | 1/1979 | Schwoegler | |
| 4,188,230 A * | 2/1980 | Gillott et al. ................. 501/140 |
| 4,256,499 A * | 3/1981 | Terrel ............................. 501/140 |
| 4,426,458 A | 1/1984 | Woodhams | |
| 6,491,751 B1 * | 12/2002 | Watson ........................ 106/756 |
| 7,141,112 B2 * | 11/2006 | Comrie ........................ 106/697 |
| 7,294,193 B2 * | 11/2007 | Comrie ........................ 106/707 |
| 7,537,655 B2 * | 5/2009 | Abbate ........................ 106/713 |
| 7,618,490 B2 * | 11/2009 | Nakashima et al. ......... 106/724 |
| 8,291,727 B2 * | 10/2012 | Quercia et al. ................ 65/21.1 |
| 8,317,915 B2 * | 11/2012 | Walenta et al. .............. 106/695 |
| 2008/0017077 A1 * | 1/2008 | Abbate ........................ 106/679 |
| 2012/0097074 A1 * | 4/2012 | Kalb et al. ................... 106/708 |

FOREIGN PATENT DOCUMENTS

| | | |
|---|---|---|
| DE | 2634852 A1 | 9/1978 |
| GB | 1363706 A | 8/1974 |
| GB | 2480686 A | 11/2011 |
| JP | 60035298 A * | 2/1985 |
| JP | 60046960 A * | 3/1985 |
| KR | 20060112442 A | 11/2006 |
| WO | 9009265 A1 | 8/1990 |

OTHER PUBLICATIONS

Machine Translation of KR 20060112442 A (Nov. 2006).*
PCT Int'l Search Report and the Written Opinion dated Jul. 16, 2013; Int'l Application No. PCT/US2013/023130; Int'l Filing Date: Jan. 25, 2013.
Hori, H. et al., Manufacture of Sulfur Concrete, Chemical Abstracts, Aug. 10, 1987, p. 345, vol. 107, No. 6, XP000189394, Columbus, OH.

* cited by examiner

*Primary Examiner* — Anthony J Green
(74) *Attorney, Agent, or Firm* — Bracewell & Giuliani LLP

(57) ABSTRACT

A sulfur-steel slag aggregate concrete, and methods of preparing the sulfur-steel slag aggregate concrete and disposing of elemental sulfur, are disclosed. In embodiments, the sulfur-steel slag aggregate concrete includes elemental sulfur, steel slag aggregate, limestone powder, and sand. Modifiers, such as plasticizers, are not required and are not used in embodiments of the sulfur-sand limestone mortar. In embodiments of the method to prepare the sulfur-steel slag aggregate concrete, each of the elemental sulfur, limestone powder, steel-slag, and sand are heated to at least 140 C, then combined, and then allowed to solidify.

19 Claims, No Drawings

SULFUR STEEL-SLAG AGGREGATE CONCRETE

CROSS-REFERENCE TO RELATED PATENT APPLICATIONS

This application claims priority to U.S. Provisional Patent Application No. 61/591,516 titled "Sulfur Steel-Slag Aggregate Concrete," filed on Jan. 27, 2012, the disclosure of which is incorporated herein by reference in its entirety.

BACKGROUND OF THE INVENTION

1. Field of the Invention

The present invention relates to a composition and method for disposing of sulfur by using it to produce a sulfur based concrete.

2. Description of the Related Art

Typical cement concrete is a mixture of Portland cement, sand, aggregates, and water. Such Portland cement concrete can be used for a variety of purposes including the construction of buildings. The Portland cement is the binder that binds the concrete together. Unfortunately, the production of Portland cement is energy intensive because production consumes significant energy and, thus, produces considerable carbon dioxide ($CO_2$). Indeed, the production of Portland cement includes heating cement clinker to 1400-1500 C, in a rotating kiln. In addition to the environmental issues, the heat required to produce cement clinker is a health and safety risk. Such energy consumption during production causes concerns about using it as a building material. Sulfur, which is abundantly produced by oil refineries, can be used as an alternative binder in concrete.

Conventional sulfur concrete contains sulfur (as a binder), aggregates, sand, and fly ash. Fly ash, which is a waste product from the combustion of coal at thermal power plants, is used as a filler material. Fly ash, however, is not always readily available. Furthermore, fly ash can be relatively expensive because of demand for fly ash for use in Portland cement concrete. The cost and unavailability of fly ash discourages the use of sulfur concrete in building components.

There are other disadvantages to the use of sulfur concrete. For example, polymer modifiers are typically needed as a modifier to increase the ductility of sulfur concrete, but such modifiers increase the cost of sulfur concrete. Another disadvantage is that Sulfur concrete prepared with conventional aggregate, such as gravel and rock, shows signs of deterioration when exposed to water and sulfuric acid. Therefore, it would be beneficial to have a sulfur concrete that eliminates the use of fly ash and polymer modifiers.

SUMMARY OF THE INVENTION

Embodiments of the present invention include a steel slag aggregate sulfur concrete, a method of preparing the steel slag sulfur concrete, and a method for disposing of elemental sulfur. Specifically, embodiments of a steel slag sulfur concrete include sulfur, fine aggregate, steel slag aggregate (a byproduct of steel manufacturing process), and limestone powder. In embodiments, the mixture includes, by weight, about 47% steel slag aggregate, 28% sand, 15% sulfur, and 10% limestone powder. Experimental data shows that steel slag aggregate sulfur concrete exhibits good performance when exposed to water and sulfuric acid. The steel slag aggregate sulfur concrete can be used for preparing structural and non-structural sulfur concrete components. The properties of embodiments of the steel slag aggregate sulfur concrete are better than that of normal sulfur concrete prepared utilizing sulfur, fly ash, and a proprietary modifier.

Embodiments of the steel slag aggregate sulfur concrete eliminate the use of conventional aggregates and commercial polymer modifiers. In embodiments, limestone powder is used as a replacement of fly ash. The use of limestone powder increases the durability of the concrete while decreasing its cost.

In embodiments, a sulfur concrete composition can include elemental sulfur; steel slag aggregate; limestone powder; and sand, the elemental sulfur being heated to at least 140 C to create a liquid state, and the steel slag aggregate, the limestone powder, and the sand each being heated to at least 140 C and then combined with the liquid state elemental sulfur, and then solidifying as it cools to create a solid state. In embodiments, the limestone powder has a fineness that allows it to pass through a No. 100 sieve. In embodiments, the composition can include about 40-50% by weight steel slag aggregate. In embodiments, the composition can include about 25-30% by weight sand. In embodiments, the composition can include about 10-15% by weight limestone powder. In embodiments, the composition can include about 15-20% by weight sulfur. In embodiments, the composition can include, by weight, about 40-50% steel slag aggregate, about 25-30% sand, about 10-15% limestone powder, and about 15-20% sulfur. In embodiments, the composition includes, by weight, about 15% sulfur, 47% steel slag aggregate, 28% sand, and 10% limestone powder.

In embodiments, the composition can have an absence of fine entrained gas cells. In embodiments, the composition can have an absence of modifiers. In embodiments, the composition can have an absence of plasticizers. In embodiments, the composition, in the solid state, is stable in water. In embodiments, the composition, in the solid state, absorbs less than 1% water by weight.

Embodiments of a method for disposing of elemental sulfur includes the steps of heating the elemental sulfur to a liquid state; heating each of steel slag aggregate, limestone powder, and sand to at least 140 C; combining the liquid-state elemental sulfur with each of the heated steel slag aggregate, limestone powder, and sand to define a concrete mixture; and cooling the concrete mixture until it solidifies. In embodiments, the steel slag is produced by purifying steel in an electric arc furnace.

DETAILED DESCRIPTION OF THE INVENTION

Solid sulfur can be produced as a by-product of oil and gas production. As one of ordinary skill will appreciate, elemental sulfur (S°) is a molecule containing only sulfur atoms (as opposed to, for example, a sulfate, such as $SO_4$). Elemental sulfur can have a yellow color when in crystalline form. Elemental sulfur can be produced as a byproduct when sulfur contaminants are removed when refining petroleum and natural gas. The sulfur can melt at temperatures in the range of about 127° C. to about 149° C. (260° to 300° F.). In one embodiment, elemental sulfur is disposed of through a process that includes heating the sulfur to a molten state and then combining it with steel slag, limestone, and sand. In one embodiment of the present invention, a sulfur-steel slag aggregate concrete ("SSAC") mix can include elemental sulfur, steel slag aggregate, limestone powder, and sand.

Limestone powder is produced from limestone by, for example, crushing limestone. Limestone can be a crystalline form of calcium carbonate ($CaCO_3$). The limestone powder is a fine powder having relatively uniform particle sizes or having various particles sizes. In one embodiment, the limestone powder can be finer than 150 micro meters, thus passing a No. 100 sieve. In one embodiment, the limestone powder improves the plasticity of the SSAC mixture, dilutes the sulfur concentration, and makes it less viscous. In one embodiment, the limestone powder can have the composition shown in Table 1.

TABLE 1

Composition of Exemplary Embodiment of Limestone Powder

| Constituent | Weight, % |
|---|---|
| CaO | 45.7 |
| $SiO_2$ | 11.8 |
| $Fe_2O_3$ | 0.68 |
| $Al_2O_3$ | 2.17 |
| MgO | 1.8 |
| LOI | 35.1 |

In one embodiment, the limestone powder does not impact the resistance of SSAC to water or acid, whereas limestone aggregates can have a negative impact. The limestone powder acts as a blender and filler. The limestone powder is also chemically bound with sulfur and therefore be protected from the water. Conventional limestone aggregate, in contrast, is directly exposed to the acid formed as a result of reaction between sulfur and water and, thus, is prone to attack by water. In various embodiments, the percentage of limestone powder can be limited to the range of about 10% to about 12.5%, as opposed to conventional sulfur concrete which can have about 47% limestone aggregate. For purposes of this specification, composition percentages indicate percentage by weight, unless otherwise indicated. Furthermore, limestone powders are less susceptible to soundness loss or loss on abrasion than the limestone aggregates. (Soundness loss test is applicable to samples retained on sieve no. 50 (300 micro meters) or larger and the loss on abrasion test is applicable to samples retained on number 8 sieve (2.36 mm) or larger).

Sand can be classified as rolled sand or dune sand. Dune sand is a type of wind-carried sand that has been piled up by the wind into a sand dune and can have rounded mineral grains. Dune sand or rolled sand can include mineral grains having diameters ranging from 0.1 to 1 mm. The sand can be used as fine aggregate in the SSAC. In embodiments, the sand used as fine aggregate is finer than 0.6 mm. In one embodiment, the fine aggregate can be quartz sand. The mineral grains can be quartz or other minerals.

In one embodiment, fine aggregate such as quartz sand is not vulnerable or is less vulnerable to damage due to, among other reasons, the fact that it is mostly quartz and finer than 0.6 mm. Acids have very low reaction on quartizitic material. Moreover, because the quartz sand is very fine, it can blend with the sulfur and limestone to form a dense matrix. The results are different if coarse sand or carbonate sand is used. Also, the carbonate-based sand, being alkaline in nature, could react with the acid formed due to the reaction of sulfur with water. Indeed, carbonate-based sand could react with the sulfuric acid produced by sulfur in the presence of moisture leading to cracking of specimens. The composition of sand for one embodiment of the SSAC is shown in Table 2.

TABLE 2

Composition of Exemplary Embodiment of Fine Aggregate

| Constituent | Weight, % |
|---|---|
| $SiO_2$ | 80-98 |
| $Fe_2O_3$ | 0.3-0.9 |
| $Al_2O_3$ | 0.6-4.0 |

TABLE 2-continued

Composition of Exemplary Embodiment of Fine Aggregate

| Constituent | Weight, % |
|---|---|
| MgO | 0.3-1.0 |
| CaO | 0.2-7.0 |

The size gradation of sand for embodiments of the SSAC are shown in Table 3.

TABLE 3

Size Gradation of Exemplary Embodiment of Fine Aggregate Sand

| Sieve size (Nominal Opening, mm) | % passing |
|---|---|
| No 4 (4.75 mm) | 100 |
| No 8 (2.40 mm) | 100 |
| No 16 (1.20 mm) | 100 |
| No 30 (0.60 mm) | 96.2 |
| No 50 (0.30 mm) | 61.4 |
| No 100 (0.15 mm) | 21.9 |
| No 200 (0.075 mm) | 1.0 |

Steel slag is used as a coarse aggregate in the SSAC. The steel slag aggregate for SSAC can be steel slag produced by purifying steel in an electric arc furnace. Such steel slag is different from the aggregates produced from blast furnace slag in terms of both the chemical composition and the physical properties, as shown in Table 4. Because slag produced by purifying steel in an electric arc furnace and slag produced by producing steel in a blast furnace can each be called "steel slag," the steel slag used in an embodiment of SSAC can be distinguished by calling it electric arc furnace slag. Unless stated otherwise, the term "steel slag" in this specification, referring embodiments of SSAC, shall refer to slag produced by purifying steel in an electric arc furnace. Steel slag or electric arc furnace slag aggregates having chemical or physical requirements similar to the properties described herein can be utilized to produce SSAC. For example, in embodiments, the steel slag has an $Fe_2O_3$ content is about 20-50% of the weight of the steel slag. In embodiments, the $Fe_2O_3$ content is about 20-30% of the weight of the steel slag. In embodiments, the $Fe_2O_3$ content is about 26.6%. The composition of an exemplary embodiment of electric arc furnace slag, and a comparison sample of blast furnace slag, is shown in Table 4.

TABLE 4

Chemical Composition and Physical Properties of Blast Furnace slag and Steel Slag (Electric Arc Furnace Slag) Aggregates.

| Property/ Composition | Steel slag (Electric arc furnace slag) aggregates as a % of slag sample, by weight (Used in embodiments of SSAC) | Blast furnace slag aggregate as a % of slag sample, by weight |
|---|---|---|
| $SiO_2$ | Less than 1 | 27-38 |
| $Fe_2O_3$ | 26.6 | Less than 2 |
| Cao | 20.2 | 34-43 |
| $Al_2O_3$ | 6.67 | 7-12 |
| MgO | 6.1 | 7-15 |
| Specific gravity | More than 3 | 2.0 to 2.5 |
| Water absorption | Less than 1 | From 1 to 6 |
| Soundness loss | Less than 1 | 12 |
| Loss on abrasion | Less than 1 | 35 to 45 |

The mixture created by combining molten sulfur, steel slag, limestone powder, and sand is used as a sulfur concrete. Sulfur concrete and sulfur mortar are each created by combining molten sulfur and one or more of aggregates, sand, and filler. The sulfur, once solidified, can serve as the binder in the sulfur concrete or sulfur mortar. The size of the aggregate can determine whether the composition is concrete or mortar, as concrete typically includes larger aggregate than mortar.

In one embodiment of the present invention, a sulfur-steel slag aggregate concrete ("SSAC") mix can include elemental sulfur, steel slag aggregate, limestone powder, and sand. Some embodiments do not use any polymer modifiers. The elemental sulfur can be, for example, the $S_3$ allotrope. Other allotropes of sulfur can be used, including $S_6$, $S_7$, $S_9$-$S_{15}$, $S_{18}$, or $S_{20}$. The sand can be quartz sand and can be dune sand or rolled sand. The limestone powder can be fine limestone powder such as, for example, finer than 150 micro meters (and thus passing a No. 100 sieve). The SSAC mix is prepared as a liquid by heating the elemental sulfur to at least 140 C to create a liquid state, and heating each of the steel slag aggregate, the limestone powder, and the sand to at least 140 C. The liquid-state sulfur and the heated steel slag aggregate, limestone powder, and sand can then be combined such that the solids are suspended in the liquid sulfur. When the liquid sulfur cools, it can create a solid state SSAC.

In one embodiment, the SSAC can have about 40-50% steel slag aggregates, 25-30% sand, 10-15% limestone powder, and 15-20% sulfur. Some embodiments have an absence of modifiers. In one embodiment, the SSAC can have about 15% sulfur. In one embodiment, the SSAC can have about 47% steel slag aggregate. In one embodiment, the SSAC can have about 28% sand. In one embodiment, the SSAC can have about 10% limestone powder. One embodiment can include about 15% sulfur, 47% steel slag aggregate, 28% sand, 10% limestone powder, and an absence of modifiers.

Each of the embodiments can have an absence of modifiers, such as chemical modifiers (including plasticizers, viscosofiers, and rheological modifiers) and air. In one embodiment, fine entrained gas cells are not intentionally introduced into the SSAC and, thus, the SSAC has an absence of fine entrained gas cells. This differs from state of the art methods which intentionally create fine entrained cells as a necessary step in creating sulfur concrete. Chemical modifiers are modifiers that are added to sulfur concrete to alter the properties of the sulfur concrete. Examples of chemical modifiers that are used in conventional sulfur concrete, but not in embodiments of SSAC, can include dicyclopentadiene (DCPD); DCPD and an oligomer of cyclopentadiene; limonene; styrene; DCPD and styrene; naphthalene; olefinic hydrocarbon polymers; bitumen; 5-ethylidene-2-norbornene; and Chempruf™.

SSAC is more stable in moist and acidic environments than sulfur concrete prepared with a commercial polymer modifier. Indeed, SSAC can be stable in applications in which it is exposed to or submerged in water for an extended period of time. Similarly, SSAC can be stable in applications in which it is exposed to or submerged in acid for an extended period of time. In one embodiment, the bond between the sulfur and the steel slag aggregate is stronger than a bond between sulfur and volcanic rock or coarse limestone aggregate. In contrast, concrete using limestone with an absence of slag decomposes when immersed in water.

Embodiments of SSAC show resistance to acid attack and absorption of water, such that the SSAC is impermeable or nearly impermeable to water. Other types of aggregate, such as coarse limestone aggregate or volcanic rock, are permeable by water and, therefore, must rely on encapsulation to prevent water-induced degradation. The water absorption of steel slag aggregate can be less than 1% by weight. In contrast, the water absorption of conventional aggregate is greater than 2% by weight.

Prior to solidifying, SSAC can have better moldability than sulfur concrete that does not include limestone powder. In one embodiment, the SSAC can have increased flowability, which can make it easier to pour than sulfur mortar that does not include limestone powder. In one embodiment, the SSAC in its liquid state, has sufficient flowability to occupy formworks when it is poured. Embodiments using fine limestone powder can be more workable than embodiments that do not use fine limestone powder such as sulfur concrete having coarse limestone aggregate or not having any limestone.

Embodiments of SSAC have shown better performance than sulfur concrete specimens prepared with limestone, basalt, or gravel aggregates on immersion in water or sulfuric acid. In one embodiment, the improved performance of the SSAC can be at least partially attributed, among other reasons, to the use of steel slag aggregates. The improved performance of the steel stag aggregates, compared to the other types of aggregates, shows the following properties of the steel slag aggregates: low soundness loss; low loss on abrasion; and low water absorption. Without being bound to any theory, it is believed that the fine limestone powder mitigates crack propagation within SSAC, thereby promoting the durability of the SSAC. Entrained gas cells are not required for such mitigation of crack propagation.

Sulfur, such as elemental sulfur, can be produced as a by-product when refining hydrocarbons such as crude oil. Some types of crude oil, known as sour crude, can have more than 0.5% sulfur. The sulfur removed from crude oil must be stored or disposed of. In embodiments, the sulfur is disposed of by incorporating it into an sulfur-steel slag aggregate concrete.

In various embodiments, sulfur-steel slag aggregate concrete is used in applications that are not exposed to temperatures greater than 120 degrees C. The applications can include pavement slabs, tiles, repair of cracked concrete, and as fair coat on walls, slabs, and beams.

In one embodiment, sulfur-steel slag aggregate concrete is used as an acid-resistant coating in applications such as flooring, fair coat on walls, structural columns and beams, and process equipment. In one embodiment, SSAC is used in applications in which the SSAC is exposed to water for an extended period of time. SSAC, including SSAC made without plasticizers or other modifiers, can be stable in water in the solid state. In one embodiment, SSAC, in the solid state, absorbs less than 1% water by weight.

In one embodiment of the SSAC, the compressive strength is greater than 54 MPa. Referring to Table 5, the compressive strength of an embodiment of sulfur-steel slag aggregate concrete is compared to concrete made with limestone aggregate, sulfur, fly ash and commercial modifier. Though the compressive strength of the latter is more than the former, the difference between the compressive strength is relatively insignificant.

TABLE 5

Compressive Strength Comparison

| Mix designation | Composition | Specimen # | Compressive strength, MPa | Average compressive strength, MPa |
| --- | --- | --- | --- | --- |
| MSC-39-NCP | Steel Slag Aggregates | 1 | 52.39 | 54.51 |
|  |  | 2 | 56.91 |  |

TABLE 5-continued

Compressive Strength Comparison

| Mix designation | Composition | Specimen # | Compressive strength, MPa | Average compressive strength, MPa |
|---|---|---|---|---|
| | Steel slag aggregates-47% Sand-28% Limestone powder-10% Sulfur-15% Modifier-0% | 3 | 54.23 | |
| MSC-11 | Lime Stone Aggregates | 1 | 62.36 | 59.95 |
| | Lime Stone Aggregates-47% Sand-28% Flyash-12.5% Sulfur-10% Modifier-2.5% | 2 | 59.53 | |
| | | 3 | 57.96 | |

Referring to Table 6, the flexural strength of an embodiment of sulfur-steel slag aggregate concrete is compared to concrete made with limestone aggregate, sulfur, fly ash and commercial modifier. Though the flexural strength of the latter is more than that of the former, the difference between the compressive strength of the two mixes is relatively insignificant.

TABLE 6

Flexural Strength Comparison

| Mix | Composition | Specimen # | Modulus of rupture, MPa | Failure mode |
|---|---|---|---|---|
| MSC-39-NCP | Steel Slag | 1 | 8.70 | Failed in Middle Third |

TABLE 6-continued

Flexural Strength Comparison

| Mix | Composition | Specimen # | Modulus of rupture, MPa | Failure mode |
|---|---|---|---|---|
| | Aggregates | 2 | 9.05 | Failed in Middle Third |
| | Steel slag | 3 | 9.26 | Failed in Middle Third |
| | aggregates-47% Sand-28% Limestone powder-10% Sulfur-15% Modifier-0% | Average | 9.00 | |
| MSC-11 | Lime Stone | 1 | 10.75 | Failed in Middle Third |
| | Aggregates | 2 | 10.86 | Failed in Middle Third |
| | Lime Stone | 3 | 12.44 | Failed in Middle Third |
| | Aggregates-47% Sand-28% Flyash-12.5% Sulfur-10% Modifier-2.5% | Average | 11.35 | |

Referring to Table 7, embodiments of SSAC having slag aggregates unexpectedly demonstrated stability in water for more than 120 days, whereas sulfur concrete having coarse limestone aggregates with modifier deteriorated after less than 4 days in water and sulfur concrete having coarse limestone aggregates without any modifiers deteriorated after less than 58 days in water. Similarly, sulfur concrete having gravel as coarse aggregate deteriorated after less than 30 days in water.

TABLE 7

Water Stability Comparison

| Test Sample # | Coarse Aggregates Types and content in the mix % | Fine Aggregates Types and content in the mix % | Filler Types and content in the mix% | Sulfur | Modifier | Days until deteriorated in water |
|---|---|---|---|---|---|---|
| 1 | Limestone 47% | Dune sand 28% | Limestone powder 10% | 12.5% | 2.5% | Less than 4 |
| 2 | Limestone 47% | Dune sand 28% | Limestone powder 10% | 15% | 0 | Less than 58 |
| 3 | Gravel 47% | Dune sand 28% | Limestone powder 10% | 10% | 2.5% | Less than 30 |
| 4 | Slag aggregates | Dune sand 28% | Limestone powder 10% | 15% | 0 | More than 120 |
| 5 | Slag aggregates | Dune sand 28% | Limestone powder 12.5% | 15% | 0 | More than 317 |

Soundness loss is a metric that can quantify a material's resistance to acid. The magnesium soundness loss (ASTM C88) is determined by immersing aggregate samples to magnesium sulfate solution for 16 to 18 hours following by drying the sample at 110 deg C. and repeating the test for number of cycles. At the end of the test the soundness loss is calculated by comparing the weight of the sample before and after the test. The soundness loss of the steel slag aggregates used in SSAC was less than that of other aggregates. As shown in Table 8, below, the soundness loss of the steel slag aggregates is less than 1%, while it is about 10% or more in the other aggregates.

TABLE 8

Soundness Loss of Various Types of Aggregate

| Aggregates | Soundness loss, % |
| --- | --- |
| Steel Slag | 0.83 |
| Limestone | 14.1 |
| Gravel | 18.2 |
| Basaltic (Igneous) | 9.26 |

Loss on abrasion is a metric that can quantify a material's resistance to damage from abrasion. The loss on abrasion of the steel slag aggregates when tested in accordance with ASTM C 131 was less than that of other aggregates. As shown in Table 9, below, the loss on abrasion of the steel slag aggregates was less than 1%, while it was more than 17% in the other types of aggregates.

TABLE 9

Loss on Abrasion of Various Types of Aggregates

| Aggregates | Loss on Abrasion, % |
| --- | --- |
| Steel Slag | 0.26 |
| Limestone | 21.2 |
| Gravel (Valley Aggregates) | 41.6 |
| Basaltic (Igneous) | 17.2* |

*Value taken from literature

Water absorption can be used to quantify the amount of water absorbed by a material. The water absorption of the steel slag aggregates was less than that of other types of aggregates, as shown in Table 10, below.

TABLE 10

Water Absorption of Various Types of Aggregates

| Aggregates | Water Absorption % |
| --- | --- |
| Steel Slag | 0.85 |
| Limestone | 2.0 |
| Gravel (Valley Aggregates) | 1.9 |
| Basaltic (Igneous) | 1.10 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A sulfur concrete composition, the sulfur concrete composition comprising:
   elemental sulfur;
   steel slag aggregate;
   limestone powder; and
   quartz sand,
   where the elemental sulfur being heated to at least 140° C. to create a liquid state, and the steel slag aggregate, the limestone powder, and the sand each being heated to at least 140° C. and then combined with the liquid state elemental sulfur, and the elemental sulfur then solidifying through cooling to create a solid state concrete composition, and
   where the composition comprises about 40-50% steel slag aggregate.

2. The composition according to claim 1, wherein the limestone powder has a fineness that allows it to pass through a No. 100 sieve.

3. The composition according to claim 1, wherein the composition comprises about 25-30% by weight sand.

4. The composition according to claim 1, wherein the composition comprises about 10-15% by weight limestone powder.

5. The composition according to claim 1, wherein the composition comprises about 15-20% by weight sulfur.

6. The composition according to claim 1, wherein the composition comprises about 40-50% by weight steel slag aggregate, about 25-30% by weight sand, about 10-15% by weight limestone powder, and about 15-20% by weight sulfur.

7. The composition according to claim 1, wherein the composition comprises about 15% by weight sulfur, 47% by weight steel slag aggregate, 28% by weight sand, and 10% by weight limestone powder.

8. The composition according to claim 1, the composition having an absence of fine entrained gas cells.

9. The composition according to claim 1, the composition having an absence of modifiers.

10. The composition according to claim 1, the composition having an absence of plasticizers.

11. The composition according to claim 1, wherein the steel slag comprises about 20-30% $Fe_2O_3$.

12. The composition according to claim 1, wherein the sand is finer than 0.6 mm.

13. A sulfur concrete composition, the sulfur concrete composition comprising:
   about 15-20% by weight elemental sulfur;
   about 40-45% by weight steel slag aggregate;
   about 10-15% by weight limestone powder; and
   about 25-30% by weight sand;
   the elemental sulfur being heated to at least 140 C to create a liquid state, and the steel slag aggregate, the limestone powder, and the sand each being heated to at least 140 C and then combined with the liquid state elemental sulfur, and the composition then solidifying through cooling to create a solid state concrete composition.

14. The composition according to claim 12, wherein the limestone powder has a fineness that allows it to pass through a No. 100 sieve.

15. The composition according to claim 12, wherein the composition comprises about 47% by weight steel slag aggregate, 28% by weight sand, 15% by weight sulfur, and 10% by weight limestone powder.

16. The composition according to claim 12, the composition having an absence of fine entrained gas cells.

17. The composition according to claim 12, the composition having an absence of modifiers.

18. A method for disposing of elemental sulfur, the method comprising the steps of:
   heating the elemental sulfur to a liquid state;
   heating each of steel slag aggregate, limestone powder, and sand to at least 140 C;
   combining the liquid-state elemental sulfur with each of the heated steel slag aggregate, limestone powder, and sand to define a concrete mixture; and
   solidifying the concrete mixture through cooling.

19. The method according to claim 17, wherein the steel slag is produced by purifying steel in an electric arc furnace.

* * * * *

UNITED STATES PATENT AND TRADEMARK OFFICE
CERTIFICATE OF CORRECTION

PATENT NO. : 8,652,251 B2  
APPLICATION NO. : 13/751885  
DATED : February 18, 2014  
INVENTOR(S) : Al-Mehthel et al.

Page 1 of 1

It is certified that error appears in the above-identified patent and that said Letters Patent is hereby corrected as shown below:

On the Title Page, Item (71) should read

(71) Applicants: line 3, replace "Petrolium" with "Petroleum"

Signed and Sealed this  
Third Day of June, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,652,251 B2  
APPLICATION NO. : 13/751885  
DATED : February 18, 2014  
INVENTOR(S) : Al-Mehthel et al.

Page 1 of 1

It is certified that error appears in the above-identified patent and that said Letters Patent is hereby corrected as shown below:

On the Title Page, Item (73) should read

(73) Assignee: line 2, add "King Fahd University of Petroleum and Minerals, Dhahran (SA)"

Signed and Sealed this
Eighteenth Day of November, 2014

Michelle K. Lee
*Deputy Director of the United States Patent and Trademark Office*